United States Patent Office 2,751,794
Patented June 26, 1956

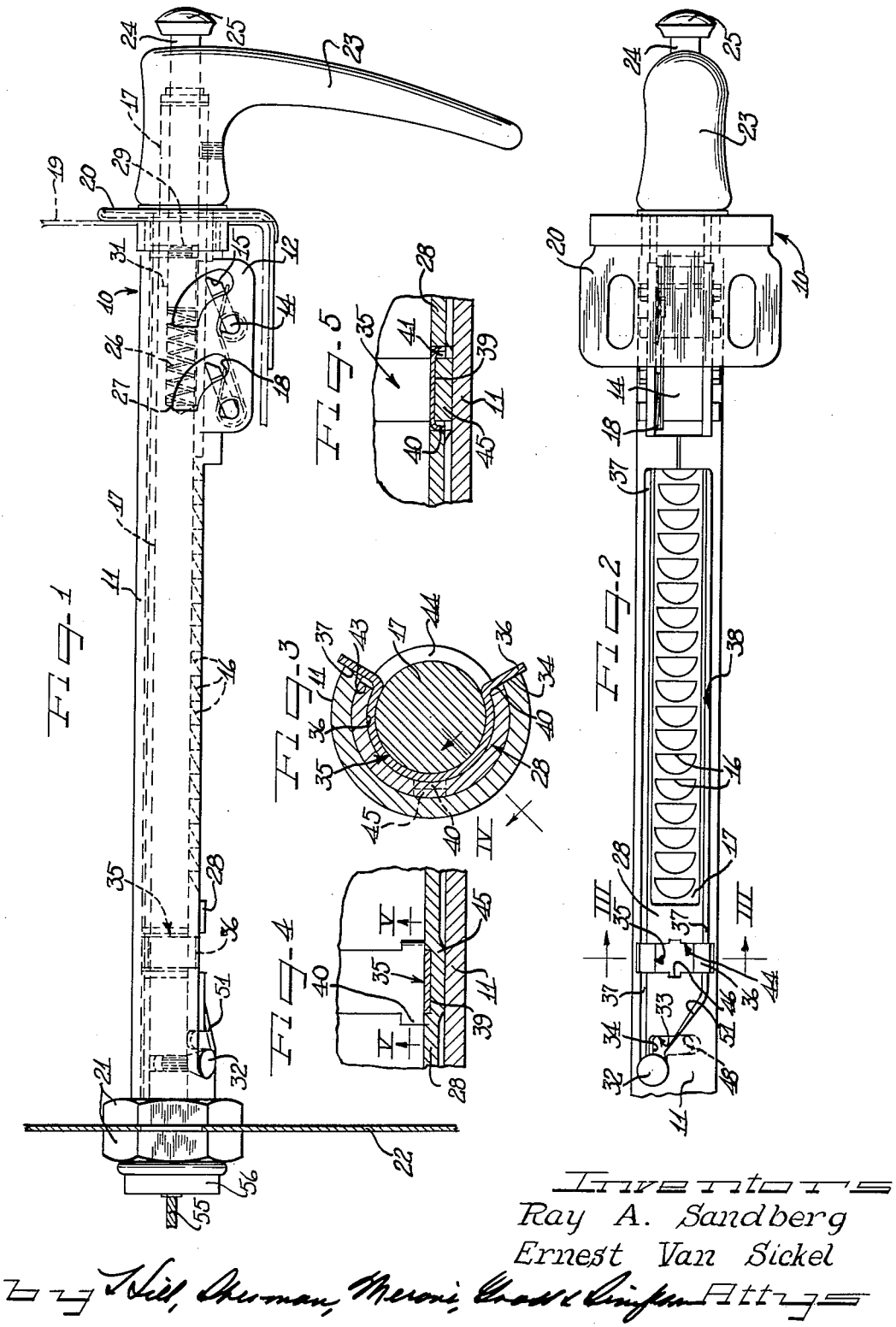

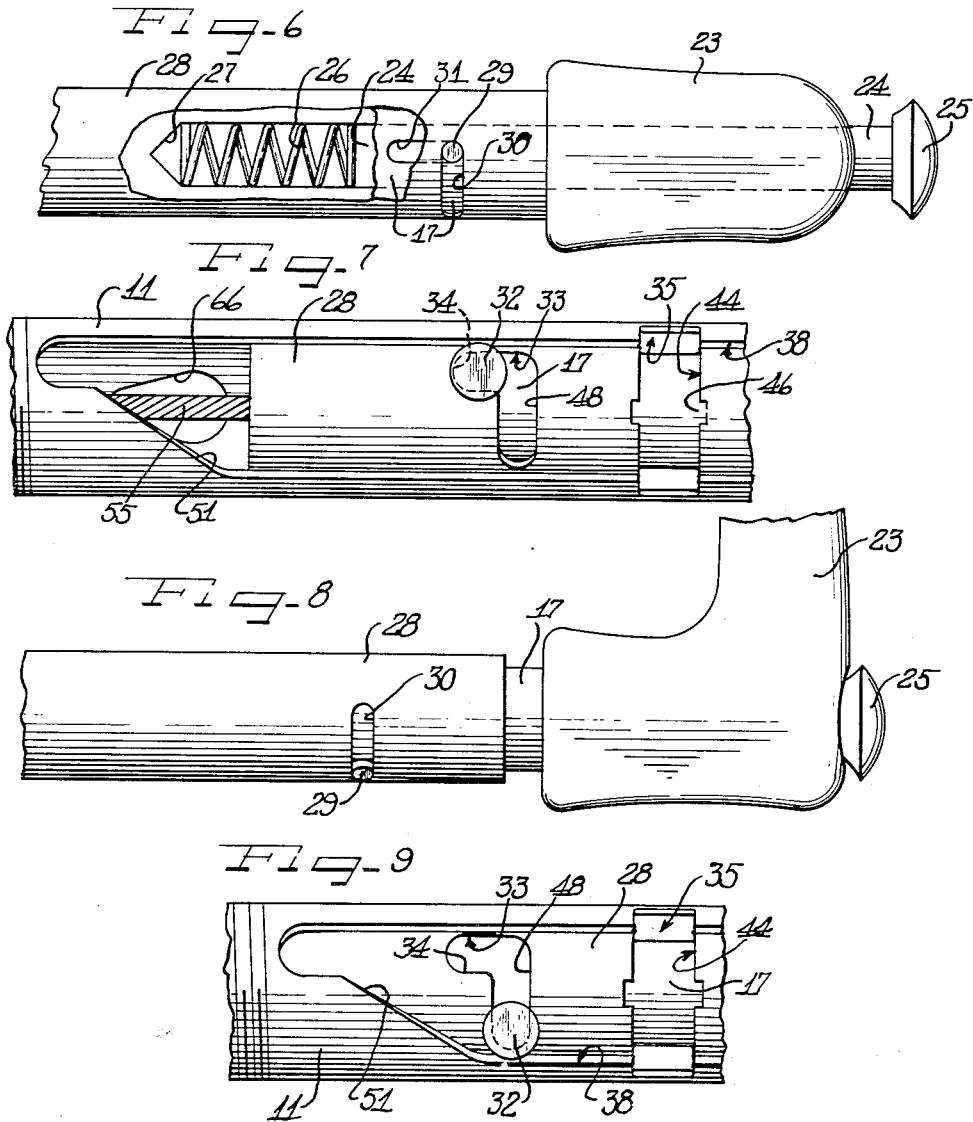

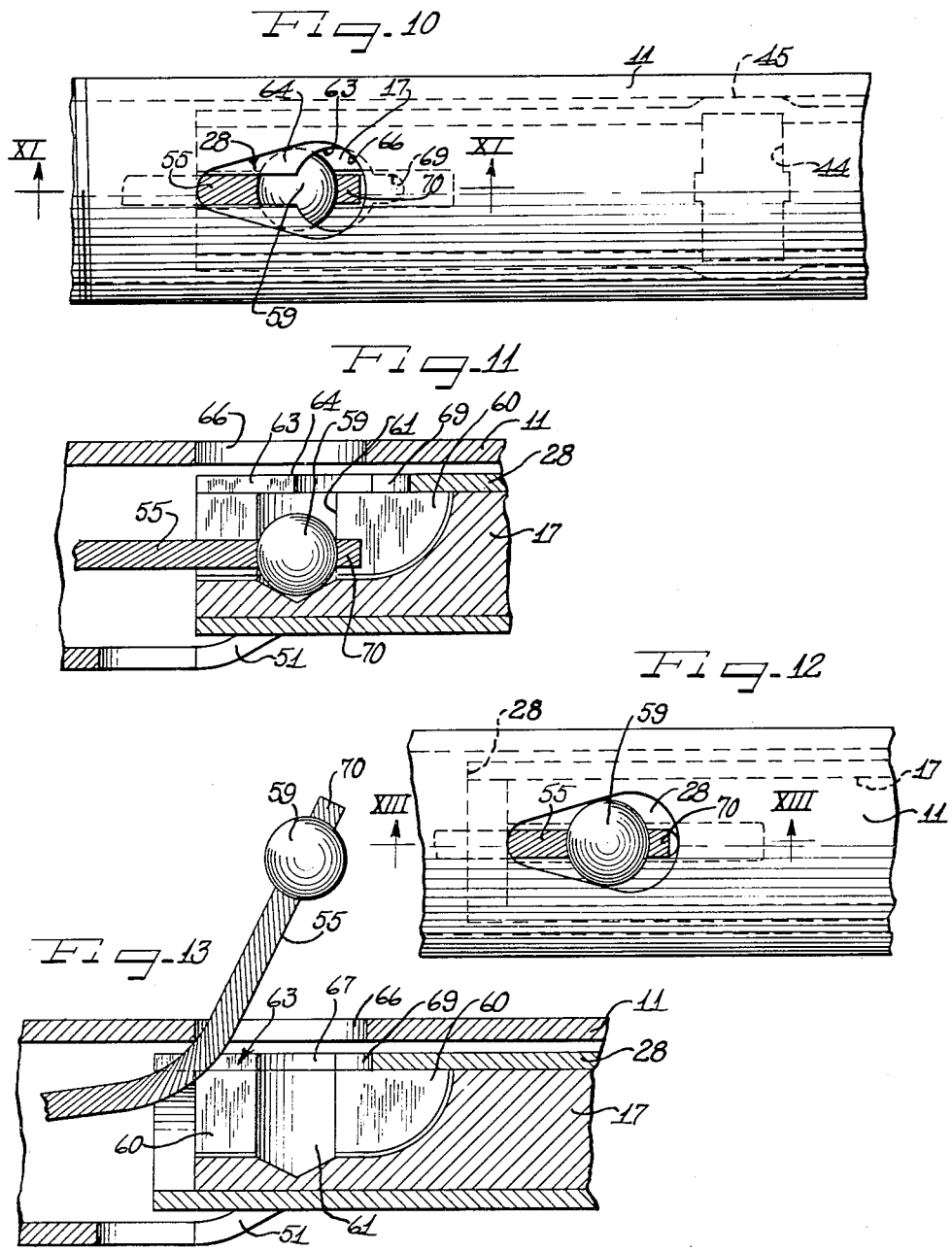

2,751,794

STRAIGHT PULL BRAKE LEVER MECHANISM

Ray A. Sandberg and Ernest Van Sickel, Waukegan, Ill., assignors to Houdaille Industries, Inc., a corporation of Michigan Application November 19, 1951, Serial No. 257,014

16 Claims. (Cl. 74—503)

This invention relates to improvements in a straight pull brake lever structure, for actuating the emergency brakes of an automobile or the like, and more particularly concerns such a brake lever structure having novel safety release mechanism.

It is an object of the present invention to provide an improved straight pull brake lever structure including a safeguard against accidental release.

Another object of the invention is to provide an improved construction for a straight pull emergency brake lever structure including an easily operable release mechanism which is equipped to avoid inadvertent actuation.

A further object of the present invention is to provide an emergency brake actuating structure for a vehicle embodying a simplified and improved safety release mechanism requiring multi-digital manipulations for releasing the brakes.

Still another object of the present invention is to provide an emergency brake actuating structure for a vehicle embodying an improved means for retaining an end of the brake actuating cable.

Other objects, features and advantages of the present invention will become apparent from the following detailed description of a preferred embodiment, for purposes of illustration only, taken in conjunction with the accompanying drawings, in which:

Figure 1 is a side elevational view of a brake lever structure according to the present invention;

Figure 2 is a fragmentary bottom plan view of the brake lever structure shown in Figure 1;

Figure 3 is an enlarged cross-sectional view taken substantially along the line III—III of Figure 2;

Figure 4 is an enlarged fragmentary longitudinal sectional view taken substantially along the line IV—IV of Figure 3;

Figure 5 is an enlarged fragmentary longitudinal sectional view taken substantially along the line V—V of Figure 4;

Figure 6 is a fragmentary top plan view of the rear end portion of the brake lever structure in brake setting position with a portion of the support tube and pull rod broken away to show the plunger and biasing compression spring before operation of the plunger;

Figure 7 is a fragmentary bottom plan view of the front end portion of the brake lever structure in brake setting position;

Figure 8 is a fragmentary top plan view similar to Figure 6, but showing the plunger in depressed position and the handle and pull rod rotated to release the brakes;

Figure 9 is a fragmentary bottom plan view similar to Figure 7, but showing the sleeve in plunger-operated position and the actuating assembly moved forward toward brake releasing position;

Figure 10 is a fragmentary top plan view of the front end portion of the assembly showing the end of the actuating cable operatively assembled with the actuating assembly;

Figure 11 is a fragmentary longitudinal sectional view taken substantially along the line XI—XI of Figure 10;

Figure 12 is a fragmentary top plan view similar to Figure 10, but showing the safety sleeve in plunger operated position during the assembly of the cable end with the actuating assembly; and Figure 13 is a fragmentary longitudinal sectional view taken substantially along the line XIII—XIII of Fig. 12 and illustrating the manner of assembly of the cable end and anchoring ball thereon with the actuating assembly.

In Figures 1 and 2 is illustrated a straight pull brake lever structure 10 for actuating the emergency brakes of a vehicle such as an automobile or a truck. The brake lever structure 10 includes a support and guide tube or housing 11 having at the rear end portion a pair of depending spaced parallel legs or flanges 12 which pivotally support a pair of ratchet pawls 14 in tandem relationship. The pawls 14 have wedge-like free end portions 15 which are adapted to engage successively a plurality of ratchet teeth 16 formed in series relationship longitudinally along a peripheral portion of a brake actuating pull rod 17 which is slidably disposed in the supporting and guiding tube 11. The pawls 14 are resiliently urged downwardly to engage the ratchet teeth 16 by means of a wire biasing spring 18 operatively encircling lower pivot arm portions of both the pawls 14 and having the end portions thereof respectively engaging respective lateral idler arms of the pawls at the wedge end portions.

For attaching the supporting and guiding tube 11 to a portion of the vehicle such as the instrument panel indicated at 19, an attachment bracket 20 of L-shaped construction is fixedly attached to the rear end portion of the tube. To provide means for attaching the tube 11 to the fire wall or dash panel 22 of the vehicle, the forward end portion of the tube may be threaded to receive a pair of nuts 21 on either side of the dash panel 22.

In order to set the brakes, the actuating rod 17 is pulled straight rearwardly, in the orientation shown in Figures 1 and 2, by means of a handle 23 on its rear end. To release the brakes, the handle 23 and the actuating rod 17 connected therewith are turned through approximately 60° to disengage the teeth 16 from the pawls 14, the tension of the brakes then pulling the actuating rod forwardly to the position shown in Figure 2.

According to the present invention, safety means are provided to prevent accidental release of the brakes but to allow easy intentional release thereof. In the present instance such means comprise mechanism for substantially locking the pull rod 17 against unintentional turning into non-ratcheting, brake releasing position, and including an actuating plunger 24 reciprocably mounted in a longitudinal rearwardly opening bore formed in the rear end portion of the rod 17. The plunger has an enlarged safety release knob or button 25 on its rear end, free of the handle 23. The plunger 24 is normally resiliently biased rearwardly by a compression spring 26, best seen in Figure 6, which is bottomed in thrust relation to the end wall of the rod bore as indicated at 27.

A sleeve 28 is reciprocally mounted on the rod 17 within the tube and in one relative longitudinal position serves to prevent rotation of the actuating rod 17 from its ratchet-pawl-engaging position and thus to prevent release of the brakes.

For reciprocating the sleeve 28 relative to the rod to permit rotation of the actuating rod 17, the plunger 24 is interconnected with the sleeve 28 by means of pin 29 on the plunger 24. As seen in Figure 6, the pin 29 engages the sleeve 28 within a transverse peripheral slot 30 adjacent the rear end of the sleeve. Reciprocating movement of the pin 29 relative to the actuating rod 17, in moving the sleeve relative to the rod, is accommodated by means of longitudinal slot 31, Figure 6.

For preventing rotation of the rod relative to the sleeve in normal relative longitudinal position of the sleeve, a guide pin 32, fixedly attached to the forward portion of the rod 17 and extending radially with respect thereto, rides in an L-shaped slot 33 in the sleeve 28 and having a transversely extending leg and a longitudinal forwardly extending leg. When the pin 32 is in the longitudinally extending leg portion 34 of the slot 33, which may be designated the normal position for the sleeve relative to the rod, relative rotation between the rod 17 and sleeve is prevented. The pin 32 and slot 33 thus constitute interacting means preventing relative rotation in normal relative position of the sleeve and rod.

In order to prevent rotation of the sleeve 28 relative to the support tube 11, a split collar 35 best seen in Figure 3, engages the sleeve and has outwardly projecting terminal lugs 36 engaging the side edges 37 of the longitudinal slot 38 formed in the support tube 11.

As seen in Figures 4 and 5, the collar 35 is seated in an internal annular groove 39 in the sleeve 28 which substantially accommodates its thickness and holds it against longitudinal movement relative to the sleeve. In order to prevent rotation of the collar 35 relative to the sleeve and further insure against relative longitudinal displacement, the collar 35 is provided with a pair of longitudinally spaced, opposed opposite edge radially outwardly extending mid-section flanges or ears 40 seated in socket openings 41 provided therefor in the sleeve.

Edges 43 defining the ends of a transverse slot 44 in the sleeve through which the terminal lugs 36 project are opposed by the terminal lugs to further insure against relative rotation between the sleeve 28 and the housing or support tube 11. As shown in Figures 4 and 5, the external wall of the sleeve 28 is offset to provide a narrow bearing shoulder 45 in radial alignment with the interior groove 39 to limit the area of sliding contact between the sleeve and housing and thus promote ease of sliding of the sleeve in the housing.

As shown in Figure 2, clearance recesses 46 are provided in the edges defining the slot 44 for accommodating passage of the flanges 40 in assembly of the collar 35 with the sleeve 28.

In operation therefore, if it is desired to set the brakes, the actuating rod 17 is pulled rearwardly by means of the handle 23, the sleeve 28 and plunger 24 moving with the rod. In brake setting position, before the plunger is depressed, the handle 23 and rod 17 cannot be rotated because of the engagement of the pin 32 with the longitudinal walls of the longitudinal slot leg portion 34.

To release the brakes, the button 25 is depressed moving the pin 29 forwardly in the slot 31 of the actuating rod 17 and moving the sleeve 28 forwardly relative to the actuating rod 17 to register the peripheral slot leg portion 48 of slot 33 with the pin 32. The rod 17 may then be rotated moving the pin 32 toward the end of the peripheral slot portion 48 and disengaging the ratchet teeth 16 from the pawls 14. The tension of the brakes will then draw the actuating rod and the sleeve 28 forwardly to the released position shown in Figures 1 and 2.

As seen in Figure 9, as the pin 32 moves forwardly toward released position it will engage a forward camming edge 51 of the slot 38 in the support tube 11 to rotate the actuating rod back to pawl-engaging or ratcheting position. The pin 32 is thus moved to register with the longitudinal slot portion 34 and the sleeve is retracted relative to the rod by the spring 26 to move the pin 32 toward the end of the longitudinal slot portion 34 to the position shown in Figures 2 and 7.

In order to connect the actuating rod 17 with a brake actuating cable 55 which enters the support tube or housing 11 through a seal 56 at the forward end of the housing, Figure 1, and extends through the dash panel 22 within the support tube, the rear end of the cable is provided with an anchoring ball 59. As best seen in Figure 11, the forward end portion of the actuating rod 17 is longitudinally slotted as indicated at 60 and has a transverse socket 61 intersecting the slot to receive the anchoring ball 59. The sleeve 28 is provided with a generally keyhole shaped aperture 63 which in normal position of sleeve 28 is out of registry with the anchoring ball 59, as best seen in Figure 10. The sleeve 28 thus provides shoulders 64 adjacent the keyhole slot which in normal position of sleeve 28 serve as keepers to retain the anchoring ball 59 in its socket in spite of any tendency toward slackening or buckling of the cable 55 to induce riding of the anchoring ball 59 out of its socket. It will be understood that whenever the plunger 24 is depressed, the actuating rod 17 is immediately thereafter rotated through approximately 60° relative to the sleeve 28 so that the socket 61 of the rod 17 will then be entirely out of register with the keyhole slot 63. The anchoring ball is thus locked against unintentional escape from the socket 61.

In assembling the cable 55 with the actuating rod 17, the actuating rod is first retracted rearwardly and the cable 55 and ball 59 inserted through the forward end of the housing 11 and upwardly through a tear-shaped slot 66 in the top portion of the housing wall. The sleeve 28 and rod 17 are then moved forwardly by depressing the plunger 24 and rotating the rod to non-ratcheting position. When the rod and sleeve have reached the position shown in Figure 13, the forward end of the keyhole slot 63 of the sleeve, which with the plunger depressed extends forwardly beyond the forward end of the rod, accommodates the upwardly curving portion of the cable. It is to be noted that the forward restricted portion of the tear-shaped slot 66 permits the rod to be moved into the position shown in Figure 13, even though the slot 60 of the rod is out of registry with the tear-shaped slot 66 and the cable extending therethrough. Thus, if the rod is moved forwardly in non-ratcheting position until the forward end thereof is stopped by the cable 55 extending through the restricted forward position of the slot 66, when the rod is turned to ratcheting position, the socket 61 of the rod will register with the large diameter portion of the tear-shaped slot 66 in support tube 11 to permit insertion of the anchor ball 59 into the socket. During insertion of the ball 59 in socket 61, the large opening 67 of the keyhole 63 of the sleeve is maintained in registry with the socket 61 by manually maintaining the plunger 24 in depressed position. Once the ball 59 is inserted in the socket 61, the plunger 24 is released and the keepers 64 snap into retaining position under the action of the spring 26, and the anchoring ball 59 is thereafter retained in the socket by the keepers 64, or the adjacent walls of the sleeve 28 when the rod 17 is rotated into non-ratcheting position. The slot portion 69 to the rear of the keyhole slot 63 in sleeve 28, Figure 10, accommodates the rear tip 70 of cable 55 during assembly.

From the foregoing description it will be understood that the present invention provides a simplified and improved straight pull brake lever construction for actuating the emergency brakes of a vehicle or the like, in which the emergency brake will not be inadvertently released. Release of the brake requires depression of a release button to release the actuating rod for subsequent rotation by an actuating handle while the button is held in the depressed position. Thus, a two-phase or double-manual operation is required to effect release of the brakes. Neither inadvertent forces exerted on the handle 23 nor accidental depression of the button 25 alone will cause release of the brakes, and the likelihood of both of these operations accidentally occurring simultaneously is quite remote.

Furthermore, the operation of the button 25 is entirely independent of the tension exerted by the brakes on the actuating rod 17 so that only a predetermined moderate thumb pressure upon the button 25 to overcome the compression spring 26 will release the brakes at any position of the actuating rod 17.

It will be understood that modifications and variations may be effected without departing from the scope of the novel concepts of the present invention.

We claim as our invention:

1. In a straight pull brake lever structure including a reciprocal and rotary actuating rod mounted in a support and a mechanism to retain the rod in incremental brake-setting positions, said mechanism being disengageable by rotation of the rod, a sleeve disposed about said rod, means engaging said sleeve and said support to substantially prevent relative rotation therebetween, but accommodating relative longitudinal movements of the sleeve and support, means engaging said sleeve and said rod in one relative longitudinal position of said sleeve with respect to said rod to substantially prevent rotation of said rod relative to said sleeve, means for longitudinally moving said sleeve relative to said rod to a second relative longitudinal position, and means for rotating said rod relative to said sleeve in said second relative position to disengage said rod retaining mechanism.

2. A straight pull brake lever structure comprising a supporting tube, a pull rod reciprocally and rotatably mounted in said tube and having ratchet teeth, pawls mounted on said tube engageable with said ratchet teeth to retain the rod in incremental brake-setting positions, said pawls being disengageable from said ratchet teeth by rotation of the rod into non-ratcheting position, a sleeve slidably mounted about said rod within said tube, means engaging said sleeve and said tube to substantially prevent rotation therebetween but accommodating relative longitudinal movements of the sleeve and tube, said sleeve having an L-shaped slot therein including a portion extending longitudinally of said sleeve and a portion extending transversely of said sleeve, a pin carried by said rod for engaging in said slot, means for urging said sleeve to move relative to said rod to move the pin toward the blind end of said longitudinal slot portion, and means for moving said sleeve to register the transverse slot portion with said pin whereby said rod can be rotated into non-ratcheting position to disengage said ratchet teeth.

3. A straight pull brake lever structure for a vehicle, comprising a support to be fixedly attached to the vehicle, an actuating rod rotatably and reciprocably mounted in said support, means between said support and said rod for retaining the rod in incremental brake-setting position in one rotary position of said rod relative to said support, said retaining means being releasable by rotation of the rod, a sleeve telescoping on said rod, means engaging said sleeve and said support to prevent relative rotation thereof but accommodating relative longitudinal movement of the sleeve and support, said rod and sleeve having interengaging means operable in said brake setting position of said rod for substantially preventing relative rotation therebetween in one relative longitudinal position of said rod and sleeve, means for moving said sleeve relative to said rod in brake setting position of said rod to disengage said interengaging means, and means for thereafter rotating said rod relative to said sleeve to release said rod retaining means.

4. In a straight pull brake lever structure including an actuating rod reciprocably and rotatably mounted in a support and mechanism for retaining the rod in incremental brake setting positions, said mechanism being disengageable by rotation of the rod, means for rotating said rod to disengage said mechanism comprising a handle on the rod, a sleeve on the rod, and means operable in said brake setting positions of said rod normally preventing rotation of the rod relative to the sleeve, and means for selectively moving said sleeve with said rod in brake setting position to release said rotation preventing means, said handle thereafter being operative to rotate said rod to disengage said rod retaining mechanism.

5. A straight pull brake lever structure comprising a support, a brake actuating rod reciprocably and rotatably disposed in said support and mechanism for retaining the rod in incremental brake setting positions, said mechanism being disengageable by limited rotation of said rod, a handle on one end of said rod, a sleeve mounted within said support and in surrounding relation to said rod, said sleeve and rod having interengaging means operative to prevent rotation therebetween in one relative longitudinal position of said sleeve and said rod and operative to limit relative rotation therebetween in a second position, and a plunger reciprocably mounted within said rod and having means engaging said sleeve for moving said sleeve longitudinally relative to said rod to said second position to release said interengaging means for limited rotation of said rod, said handle thereafter being rotatable to rotate said rod to disengage said rod retaining mechanism.

6. In a straight pull brake lever structure including a reciprocal and rotary actuating rod mounted in a support and mechanism to retain the rod in incremental brake-setting positions, said mechanism being disengageable by rotation of the rod, a sleeve disposed about said rod, means engaging said sleeve and said support to substantially prevent relative rotation therebetween, means engaging said sleeve and said rod in one relative longitudinal position of said sleeve and rod to substantially prevent rotation of said rod relative to said sleeve, means including a plunger telescoping within one end of said rod for longitudinally moving said sleeve relative to said rod to a second relative longitudinal position, and means on said one end of said rod for rotating said rod relative to said sleeve in said second relative position to disengage said rod retaining mechanism.

7. A straight pull brake lever structure for a vehicle comprising a support to be fixedly attached to the vehicle, an actuating rod rotatably and reciprocably mounted in said support, means operative between said support and said rod for retaining the rod in incremental brake-setting positions in one rotary position of said rod relative to said support, said retaining means being releasable by rotation of the rod into another rotary position for releasing the brakes, a sleeve slidably mounted on said rod, means engaging said sleeve and said support to prevent relative rotation therebetween, said sleeve having an L-shaped slot including a longitudinally extending portion and a laterally extending portion, said rod having lateral pin engaging in said slot, means for urging said sleeve to relatively engage said pin in said longitudinally extending slot portion, means including a plunger reciprocably mounted in one end of said rod for moving said sleeve longitudinally to register said pin with the laterally extending slot portion, and means for rotating said rod, said pin moving toward the end of said laterally extending slot portion upon rotation of said rod to brake release rotary position.

8. A straight pull brake lever structure for actuating the brakes of a vehicle, comprising a support fixedly attached to the vehicle, an actuating assembly reciprocably and rotatably mounted in said support, means for retaining the assembly in incremental brake-setting positions, said means being disengageable by rotation of said assembly, said assembly being thereafter longitudinally movable in a brake releasing direction, a handle on one end of said actuating assembly, longitudinally movable means extending within said support for controlling rotation of said actuating assembly, means slidably engaging said support and engaging said longitudinally movable means to prevent relative rotation therebetween, said actuating assembly and longitudinally movable means having interacting means engageable in brake-setting positions of said actuating assembly to prevent relative rotation therebetween in normal longitudinal position of said longitudinally movable means relative to said actuating assembly, and means associated with said handle and operatively connected with said longitudinally movable means to move the longitudinally movable means with said actuating assembly in brake-setting position to disengage said interacting means, said handle thereafter being operative to rotate the actuating assembly to disengage said assembly retaining means.

9. In a straight pull brake lever structure including an actuating assembly rotatably and reciprocably mounted in a support and mechanism for permitting longitudinally incremental brake setting movement of the assembly when the mechanism is engaged, said mechanism being disengageable by rotation of the actuating assembly, and means for disengaging said mechanism comprising a member affixed to said actuating assembly; control means for the actuating assembly normally movable therewith, means mounting said control means with said actuating assembly for relative movement thereof, means engaging said control means and said support to prevent relative rotation thereof, said control means and actuating assembly having interacting means engageable in normal position of said control means with respect to said actuating assembly with said actuating assembly in brake setting condition, and means for moving said control means relative to said actuating assembly with said actuating assembly in brake setting condition to disengage said interacting means.

10. A straight pull brake lever structure comprising a supporting tube, a pull rod slidably and rotatably mounted in said tube and mechanism to retain the rod in brake-setting positions, said mechanism being disengageable by rotation of the rod out of brake-setting orientation, a sleeve reciprocably mounted relative to said rod within said tube, means operative to retain said sleeve in a predetermined position relative to said rod, means engaging said sleeve and said tube to substantially prevent rotation therebetween, but accommodating relative longitudinal movement of the sleeve and tube, a handle on one end of said rod for retracting and rotating thereof, said rod having a socket at the other end thereof for receiving a brake cable anchoring ball, said sleeve having an aperture longitudinally aligned with said socket in brake-setting orientation of the rod but normally longitudinally offset from said socket to retain the ball in the socket, said sleeve being operative with said rod in said brake-setting positions to prevent relative rotation between the sleeve and rod in normal predetermined relative position, and means for axially shifting said sleeve relative to said rod to register said sleeve aperture radially with said socket, for insertion of the cable ball into the socket in assembly.

11. In a straight pull brake lever structure including an actuating rod reciprocably and rotatably mounted in a support and means affording incremental brake-setting longitudinal adjustment of the rod, a sleeve telescoped about said rod and rotatable and movable relative thereto, said rod and sleeve in normal relative longitudinal positions having means interengaging to prevent relative rotation therebetween, resilient means between said rod and sleeve urging said sleeve into said normal position relative to the rod, and means for moving said sleeve out of normal position relative to said rod against the action of said resilient means to release said interengaging means, said rod and sleeve thereafter being relatively rotatable independently of the movement of said sleeve by said moving means.

12. In a straight pull brake lever structure including an actuating rod reciprocably and rotatably mounted in a support and means affording incremental brake-setting movement of the rod, a sleeve telescoping over said rod and rotatively and reciprocably mounted relative thereto, said rod and sleeve in normal relative longitudinal positions having means interengaging to prevent relative rotation therebetween, resilient means between said rod and sleeve urging said sleeve into said normal position relative to the rod, means for moving said sleeve out of normal position relative to said rod against the action of said resilient means, said rod and sleeve thereafter being relatively rotatable, said rod having a socket therein for anchoring the brake actuating cable, said sleeve at least partially closing said socket in normal relative position and having an aperture for registration with said socket upon movement of the sleeve by said moving means during assembly of the cable in the socket.

13. In a straight pull brake lever structure, an actuating rod having in one end portion a recess opening on the periphery thereof for anchoring a cable end therein, and movable means carried by said rod for overlying said recess to lock an anchored cable end portion in said rod recess, said movable means being movable with the rod in a fixed predetermined position to a position out of overlying relationship to said recess.

14. In a straight pull brake lever structure, an elongated housing having walls defining a longitudinal slot, an actuating rod rotatably and reciprocably mounted in said housing, a sleeve telescoped about said rod within said housing, and a split collar non-rotatably interconnected with the sleeve and having terminal portions engaging said longitudinal walls defining said slot to prevent relative rotation of the sleeve and housing but accommodating relative reciprocal movement of the sleeve and housing.

15. In a straight pull brake lever structure, a housing, an actuating rod rotatably and reciprocably mounted in said housing and having longitudinally spaced ratchet teeth thereon, a sleeve mounted with said housing and in surrounding relation to said rod, said sleeve having a longitudinal opening exposing said ratchet teeth, pawl means carried by said housing for coacting with said exposed ratchet teeth, interlock means at the forward end portion of the sleeve beyond said longitudinal sleeve opening and on said rod for interengaging to prevent relative rotation of the rod and sleeve and releasable by longitudinal movement of said sleeve relative to said rod, means at the forward end portion beyond said sleeve opening for interengaging with said housing to prevent relative rotation of the sleeve and housing, and means at the rear end portion of said sleeve for engaging said sleeve to move the same longitudinally relative to said rod to release said interlock means.

16. A brake structure comprising a brake support, an actuating assembly movably mounted by said support, means for retaining the assembly in successive longitudinal positions, said retaining means being releasable by movement of said actuating assembly in a predetermined sense, longitudinally movable means extending along said actuating assembly for controlling the movement of said actuating assembly in the sense to release said retaining means, said actuating assembly being longitudinally movable in brake-setting direction with said retaining means in retaining relation and said longitudinally movable means in condition to prevent movement of said actuating assembly to release said retaining means, and said longitudinally movable means having interacting means engageable in brake setting position of said actuating assembly to prevent movement of said actuating assembly in the sense to release said retaining means.

References Cited in the file of this patent

UNITED STATES PATENTS

| | | |
|---|---|---|
| 1,401,093 | McDaniels | Dec. 20, 1921 |
| 1,942,273 | Bosworth | Jan. 2, 1934 |
| 2,126,234 | Weber | Aug. 9, 1938 |
| 2,170,900 | Jandus et al. | Aug. 29, 1939 |
| 2,180,215 | Saunders et al. | Nov. 14, 1939 |
| 2,190,087 | Snell | Feb. 13, 1940 |
| 2,449,516 | Shakespeare | Sept. 14, 1948 |
| 2,522,540 | Sandberg | Sept. 19, 1950 |
| 2,543,510 | Sandberg | Feb. 27, 1951 |
| 2,557,365 | Weber | June 19, 1951 |
| 2,666,338 | Sandberg | Jan. 19, 1954 |

FOREIGN PATENTS

| | | |
|---|---|---|
| 516,309 | Great Britain | Dec. 29, 1939 |
| 537,039 | Great Britain | June 6, 1941 |